United States Patent
Regenor

(10) Patent No.: US 12,021,997 B2
(45) Date of Patent: Jun. 25, 2024

(54) BLOCKCHAIN TOKENIZATION OF AIRCRAFT AND OTHER COMPLEX MACHINERY

(71) Applicant: VeriTX Corp., Buffalo, NY (US)

(72) Inventor: James Allen Regenor, East Aurora, NY (US)

(73) Assignee: VERITX CORP., Buffalo, NY (US)

( * ) Notice: Subject to any disclaimer, the term of this patent is extended or adjusted under 35 U.S.C. 154(b) by 368 days.

(21) Appl. No.: 17/457,791

(22) Filed: Dec. 6, 2021

(65) Prior Publication Data

US 2022/0200808 A1    Jun. 23, 2022

Related U.S. Application Data

(60) Provisional application No. 63/183,701, filed on May 4, 2021, provisional application No. 63/127,780, filed on Dec. 18, 2020.

(51) Int. Cl.
*H04L 29/00* (2006.01)
*H04L 9/32* (2006.01)
*H04L 9/00* (2022.01)

(52) U.S. Cl.
CPC .......... *H04L 9/3239* (2013.01); *H04L 9/3247* (2013.01); *H04L 9/50* (2022.05)

(58) Field of Classification Search
CPC ....... H04L 9/3239; H04L 9/3247; H04L 9/50; H04L 2209/84
See application file for complete search history.

(56) References Cited

U.S. PATENT DOCUMENTS

| | | | | |
|---|---|---|---|---|
| 9,726,578 | B2 * | 8/2017 | Miller | G01N 1/2205 |
| 10,505,726 | B1 * | 12/2019 | Andon | G06Q 30/0185 |
| 10,540,654 | B1 * | 1/2020 | James | G06Q 20/223 |
| 10,654,596 | B1 | 5/2020 | Eller | |
| 10,673,619 | B1 * | 6/2020 | Shi | G06Q 20/389 |
| 10,899,477 | B2 | 1/2021 | Snyder | |

(Continued)

FOREIGN PATENT DOCUMENTS

CN    111316279 A  *  6/2020  ............. G06F 16/27

OTHER PUBLICATIONS

Ken Douglas, 3DP in Zero-G, 3D Printing in Space: 10+ Projects to Watch in 2021, available at https://all3dp.com/2/3d-printing-in-space-projects/; Jan. 17, 2021 (Year 2021).

*Primary Examiner* — Don G Zhao
(74) *Attorney, Agent, or Firm* — Woods Oviatt Gilman LLP; Katherine H. McGuire, Esq.

(57) ABSTRACT

A method of blockchain tokenization of aircraft and other complex machinery includes creating a series of nesting Blockchain Smart Contracts (BSC) or Blockchain Nonfungible Tokens (BNFT) to digitally twin the complete structure of an aircraft or other complex machines, and collect data from the series of nesting BSC or BNFT through the full product life cycle. Each BSC or BNFT represents a part of the aircraft or other complex machine, from an individual part level ($X_p$) to a component level ($X_c$) to a subsystem level ($X_{ss}$) and/or a system level ($X_s$) to an aircraft or other complex machine level ($X_a$), in a cascading architecture. The collected data may be used to perform reverse forensics in the case of a part failure or mishap, and/or to track and trace a part of the aircraft or other complex machine.

19 Claims, 1 Drawing Sheet

(56) References Cited

U.S. PATENT DOCUMENTS

| | | |
|---|---|---|
| 10,965,461 B1 | 3/2021 | Wright et al. |
| 11,014,303 B1 | 5/2021 | Higham et al. |
| 11,228,115 B2 | 1/2022 | Hoyt |
| 11,291,077 B2 * | 3/2022 | DeLuca ................ H04L 9/0643 |
| 11,645,594 B2 * | 5/2023 | Walls ............... G06Q 10/06316 |
| | | 705/7.15 |
| 2015/0207786 A1 | 7/2015 | Pitroda |
| 2015/0231826 A1 | 8/2015 | Snyder et al. |
| 2016/0067919 A1 | 3/2016 | Hoyt et al. |
| 2017/0103385 A1 * | 4/2017 | Wilson, Jr. ............ H04L 9/3239 |
| 2017/0103468 A1 * | 4/2017 | Orsini ................... H04L 9/3239 |
| 2017/0240298 A1 | 8/2017 | Goehlich et al. |
| 2017/0323274 A1 * | 11/2017 | Johnson ............... G05B 13/041 |
| 2017/0323403 A1 * | 11/2017 | Johnson ........... G06Q 10/06314 |
| 2018/0012311 A1 * | 1/2018 | Small ..................... B22F 10/39 |
| 2018/0141161 A1 | 5/2018 | Elmer |
| 2018/0281303 A1 | 10/2018 | Yerazunis et al. |
| 2019/0025810 A1 * | 1/2019 | Chapin .................. G06Q 10/20 |
| 2019/0027835 A1 | 1/2019 | Hoyt |
| 2019/0050806 A1 * | 2/2019 | Klein ...................... H04W 4/70 |
| 2019/0146436 A1 * | 5/2019 | Perez Zarate .......... G16H 40/67 |
| | | 700/287 |
| 2019/0147411 A1 * | 5/2019 | John ..................... F01D 21/003 |
| | | 705/305 |
| 2019/0147412 A1 * | 5/2019 | Chiaramonte ......... G06Q 10/20 |
| | | 705/7.13 |
| 2019/0156600 A1 * | 5/2019 | Potyrailo ............. G07C 5/0816 |
| 2019/0188787 A1 * | 6/2019 | Besanson Tuma ... H04L 9/0637 |
| 2019/0279227 A1 * | 9/2019 | Chantz .................. H04W 12/10 |
| 2019/0299105 A1 * | 10/2019 | Knight ............... G06Q 20/0658 |
| 2019/0384587 A1 * | 12/2019 | Rao ........................ G06F 21/572 |
| 2019/0392511 A1 * | 12/2019 | Mahajan ............... H04L 9/3239 |
| 2020/0028691 A1 * | 1/2020 | Rao ........................ G06F 8/658 |
| 2020/0034457 A1 * | 1/2020 | Brody .................. H04L 9/0819 |
| 2020/0053081 A1 * | 2/2020 | Park ...................... H04L 9/3239 |
| 2020/0111068 A1 | 4/2020 | Scarselli |
| 2020/0204375 A1 * | 6/2020 | Coulmeau .............. G06N 20/10 |
| 2020/0213121 A1 * | 7/2020 | Hioki .................... H04L 9/3239 |
| 2020/0294011 A1 * | 9/2020 | Robertson ............... H04L 63/12 |
| 2020/0304290 A1 * | 9/2020 | Coulmeau ............ G06F 21/645 |
| 2020/0334752 A1 * | 10/2020 | Doney ............... G06Q 20/3672 |
| 2020/0334995 A1 * | 10/2020 | Pabia ................... G08G 5/0043 |
| 2020/0342539 A1 * | 10/2020 | Doney ............... G06Q 20/3829 |
| 2020/0351399 A1 * | 11/2020 | Young ................... G06Q 10/00 |
| 2020/0382503 A1 * | 12/2020 | Sabnis ................. G08G 5/0021 |
| 2021/0004739 A1 * | 1/2021 | Gill ...................... G06Q 10/067 |
| 2021/0035061 A1 * | 2/2021 | Pashov .................. G06Q 50/18 |
| 2021/0065085 A1 * | 3/2021 | Walls ............. G06Q 10/063118 |
| 2021/0065293 A1 * | 3/2021 | Sigler .................... G06Q 20/24 |
| 2021/0067342 A1 * | 3/2021 | Guinard ................ H04L 9/0866 |
| 2021/0150626 A1 * | 5/2021 | Robotham .......... H04L 63/0807 |
| 2021/0192470 A1 * | 6/2021 | Krueger ................ G06Q 10/20 |
| 2021/0209091 A1 * | 7/2021 | Jing ...................... H04L 9/3247 |
| 2021/0224362 A1 | 7/2021 | Goldston et al. |
| 2021/0256070 A1 * | 8/2021 | Tran .................. G06F 16/90332 |
| 2022/0138705 A1 * | 5/2022 | Wright ................ G06Q 20/065 |
| | | 705/39 |
| 2022/0269754 A1 * | 8/2022 | Cardo Sanchez ..... G06F 21/105 |
| 2022/0366494 A1 * | 11/2022 | Cella ........................ H04L 9/50 |

\* cited by examiner

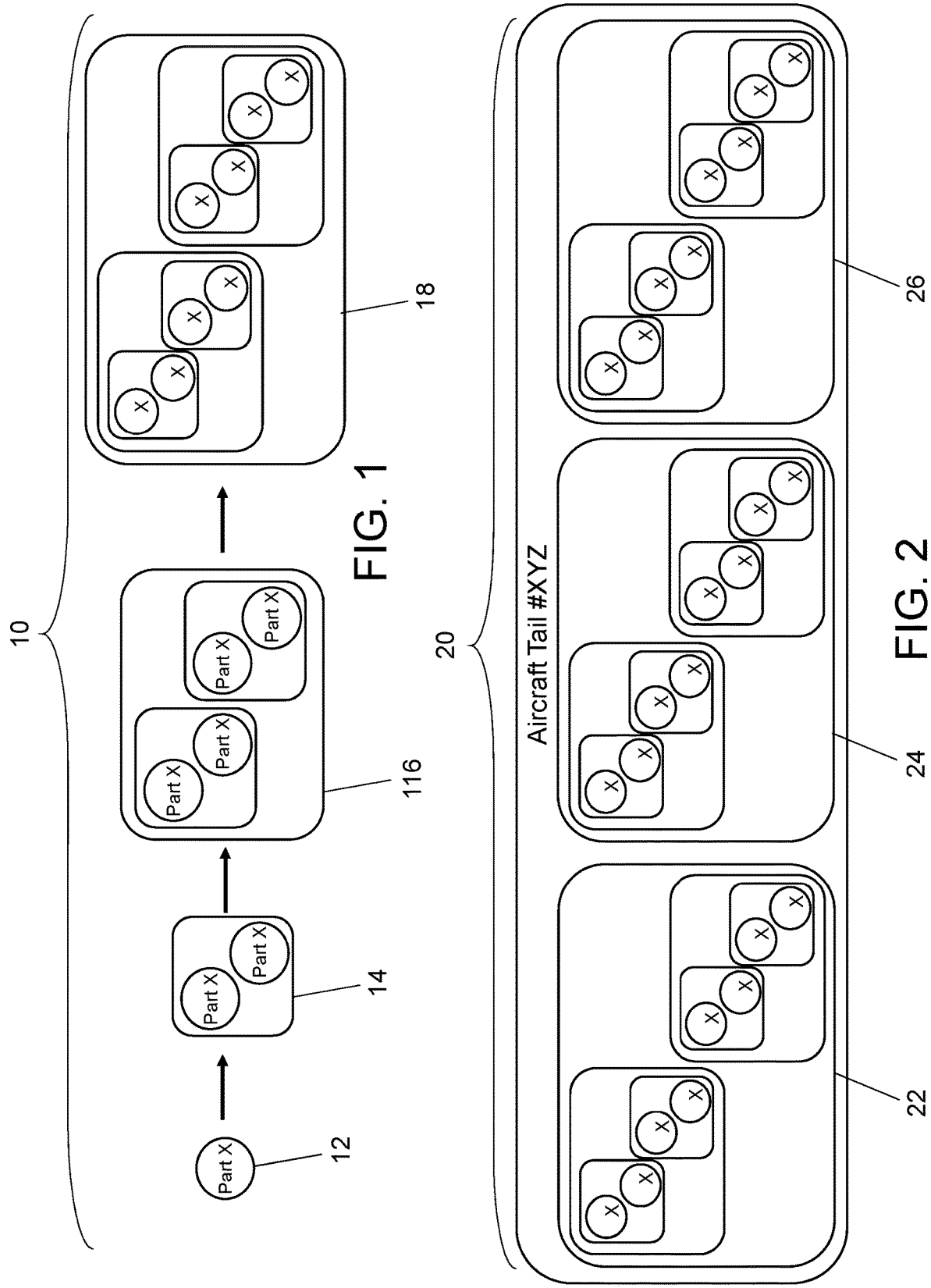

BLOCKCHAIN TOKENIZATION OF AIRCRAFT AND OTHER COMPLEX MACHINERY

FIELD OF THE INVENTION

The present invention broadly relates to blockchain technology, and more particularly relates to a comprehensive method and system for blockchain tokenization of aircraft and other complex machinery.

SUMMARY OF THE INVENTION

The present invention provides in a first embodiment a system and method of blockchain tokenization of aircraft and other complex machinery comprising creating a series of nesting Blockchain Smart Contracts (BSC) to digitally twin the complete structure of an aircraft or other complex machines that can be used to collect data from through the full product life cycle; be used for reverse forensics in the case of a part failure or mishap; and track and trace the part. Each BSC represents a part from an individual part to a component to a subsystem to a system to an aircraft or other complex machine in a cascading architecture. As one part is changed out a new part and representative BSC is created. The removed part and BSC is still tracked through repair and or overhaul and use on a new aircraft.

In another embodiment the invention provides a system and method of creating a series of Blockchain Nonfungible Tokens (BNFT) to digitally twin the complete structure of an aircraft or other complex machines that can be used to collect data from through the full product life cycle; be used for reverse forensics in the case of a part failure or mishap; and track and trace the part. Each BNFT represents a part from an individual part to a component to a subsystem to a system to an aircraft or other complex machine in a cascading architecture. As one part is changed out a new part and representative BNFT is created. The removed part and BNFT is still tracked through repair and or overhaul and use on a new aircraft.

The invention may be used for reverse forensics in the case of a part failure or mishap. It may also be used to track and trace the part. Each BSC or BNFT represents a part from an individual part to a component to a subsystem to a system to an aircraft or other complex machine in a cascading architecture. As one part is changed out a new part and representative BSC or BNFT is created. The removed part and BSC or BNFT is still tracked through repair and or overhaul and use on a new aircraft.

Additional objects, advantages and novel aspects of the present invention will be set forth in part in the description which follows, and will in part become apparent to those in the practice of the invention, when considered with the attached figures.

BRIEF DESCRIPTION OF THE DRAWINGS

The above-mentioned and other features and advantages of this invention, and the manner of attaining them, will become apparent and be better understood by reference to the following description of the invention in conjunction with the accompanying drawing, wherein:

FIG. 1 is a simplified block diagram of the functional blocks forming the block chain according to an embodiment of the invention; and FIG. 2 is a a simplified block diagram of the functional blocks forming the block chain according to an embodiment of the invention which represents systems as part of an aircraft tail # xyz, for example, or another complex machine.

DETAILED DESCRIPTION OF THE INVENTION

The present invention is described below in enabling detail by the following examples, which may represent more than one example embodiment of the present invention. Generally, the systems and methods described herein may be implemented in hardware, software, and/or a combination thereof, and functionality may be distributed across a variety of computing devices. The present invention provides a computer-implemented method programmed for execution in a computing environment. An exemplary system 10 that may be used to implement the methods and aspects described herein may include one or more computing devices, one or more memories storing computer-executable instructions (e.g., software/programs/applications) and processor(s) for executing the instructions, and may be in communication with each other via a system bus or over a network via wired and/or wireless connections. It is also contemplated that system 10 may communicate with one or more remote computers, controllers, or servers that is/are accessible by the computing devices through a network to store and execute any of the functionality and processes described below.

Referring to FIG. 1, there is seen an embodiment of the present invention which provides in a first aspect a method and system 10 of blockchain tokenization of aircraft and other complex machinery comprising creating a series of nesting Blockchain Smart Contracts (BSC) or Blockchain Nonfungible Tokens (BNFT).

One possible example of utilizing system 10 is to digitally twin the complete structure of an aircraft or other complex machines that can be used to collect data from through the full product life cycle.

The BSC or BNFT begins with the representation of one part "Part X" indicated at 12. The next step 14 to the immediate right of step 12 illustrates two individual Part Xs as a single component. The next step 16 to the immediate right of step 14 illustrates how two of the components 14 make up a Subsystem x. The next step 18 to the immediate right of step 16 illustrates two subsystems x making up a System X.

FIG. 2 illustrates at 20 a BSC representation of an aircraft tail with number XYZ comprised of three systems 22, 24 and 26 which are comprised of two subsystems each where each subsystem is comprised of two components where each component is comprised of two parts. It should be noted that this is a non-limiting illustrative example, and each level of the cascading architecture may include a different number of elements (one, three or more, etc.).

According to some example embodiments, a method of blockchain tokenization of aircraft and other complex machinery includes creating a series of nesting Blockchain Smart Contracts (BSC) or Blockchain Nonfungible Tokens (BNFT) to digitally twin the complete structure of an aircraft or other complex machine, and collecting data from the series of nesting BSC or BNFT through the full product life cycle.

Each BSC or BNFT represents a part of the aircraft or other complex machine, from an individual part level ($X_p$) to a component level ($X_c$) to a subsystem level ($X_{ss}$) and/or a system level ($X_s$) to an aircraft or other complex machine level ($X_a$), in a cascading architecture. A component includes one or more individual parts, a subsystem includes one or more components, a system includes one or more subsystems, and an aircraft or other complex machine includes one or more systems.

In some example embodiments, the data collected from the series of nesting BSC or BNFT can be used to perform reverse forensics in the case of a part failure or mishap of the aircraft or other complex machine. In some other example embodiments, the data collected from the series of nesting BSC or BNFT to track and trace a part of the aircraft or other complex machine. As one part is removed and changed out for another part, a new part and representative BSC or BNFT is created in the series of nesting BSC or BNFT. In this case, the removed part and representative BSC or BNFT can still be tracked through repair and/or overhaul for use on another aircraft or complex machine.

Thus, as discussed above, the invention may be used for reverse forensics in the case of a part failure or other mishap. It may also be used to track and trace a part. Each BSC or BNFT represents a part from an individual part to a component to to a subsystem to a system to an aircraft or other complex machine in a cascading architecture. As one part is changed out a new part and representative BSC or BNFT is created. The removed part and BSC or BNFT is still tracked through repair and or overhaul and use on a new aircraft.

An exemplary computing environment can be used to implement any of the processing described above. The computing environment may include one or more computers, input/output devices, memories, processors (e.g., CPUs, microprocessors), displays with graphical user interfaces (GUIs), and the like, which allow for implementation of the present invention. Other peripheral devices (e.g., USB drives) may be connected to the computers to transfer information (e.g., files, documents, images, text, data, instructions, messages, etc.) to and from the computers. The system memories may include various non-transitory computer-readable media including program modules, data structures, application programs, operating systems, and other data for the computers, as known in the relevant art. The computers may operate in a networked environment using logical connections with each of the system components described above. Known network interfaces provide communication paths between the computers and allows for the methods described above to be performed.

While the apparatus, methods and systems have been shown and described with reference to certain preferred embodiments thereof, it will be understood by those skilled in the art that various changes in form and details may be made therein without departing from the spirit and scope of the claims which follow.

What is claimed is:

1. A method of blockchain tokenization of a complex machine, the method comprising:
   a) creating a complex machine hierarchy for the complex machine, wherein the complex machine hierarchy includes a cascading architecture wherein the complex machine comprises a plurality of systems, wherein each respective system within the plurality of systems comprises one or more subsystems, wherein each respective subsystem within the one or more subsystems comprises a plurality of parts;
   b) creating an individual digital twin for each respective part within each respective plurality of parts;
   c) assigning a unique identifier to each respective individual digital twin; and
   d) creating a series of nesting unique identifiers, wherein the series of nesting unique identifiers forms a complete digital twin of the complex machine including each of the individual digital twins.

2. The method according to claim 1, wherein each BSC unique identifier represents a portion of the complex machine hierarchy, from an individual part level (Xp) to a subsystem level (Xss) and/or a system level (Xs) to a complex machine level (Xa).

3. The method according to claim 1, wherein the one or more subsystems comprises a plurality of components, and wherein each respective component within the plurality of components comprises the plurality of parts.

4. The method according to claim 3, wherein the complex machine hierarchy further includes a component level (Xc).

5. The method according to claim 1, further comprising collecting data from the series of nesting unique identifiers throughout a life cycle of each respective part within the plurality of parts.

6. The method according to claim 5, further comprising performing reverse forensics on a specific part within the complex machine hierarchy using the data collected from the series of nesting unique identifiers.

7. The method according to claim 5, further comprising tracking or tracing a specific part within the complex machine hierarchy using the data collected from the series of nesting unique identifiers.

8. The method according to claim 7, further comprising creating an updated series of nesting unique identifiers after the specific part is removed and changed out for a replacement part, wherein a replacement digital twin is created for the replacement part and the replacement digital twin in assigned a unique replacement identifier, and wherein the unique identifier of the specific part is deleted from the updated series of nesting unique identifiers the unique replacement identifier is included within the updated series of nesting unique identifiers.

9. The method according to claim 8, wherein the removed specific part, along with its individual digital twin and unique identifier, is tracked through repair and/or overhaul for use in a second complex machine, wherein the specific part unique identifier is added to a second series of nesting unique identifiers for the second complex machine.

10. The method according to claim 1, wherein the complex machine is an aircraft.

11. The method according to claim 1, wherein the unique identifier is a Blockchain Smart Contract (BSC).

12. The method according to claim 1, wherein the unique identifier is a Blockchain Non-Fungible Token (BNFT).

13. The method according to claim 1, wherein the unique identifier is either a Blockchain Smart Contract (BSC) or a Blockchain Non-Fungible Token (BNFT).

14. The method according to claim 1, further comprising creating an individual digital twin for each respective system and each respective subsystem.

15. The method according to claim 14, further comprising collecting data from the series of nesting unique identifiers throughout a life cycle of each respective part, each respective system, and each respective subsystem.

16. The method according to claim 15, further comprising performing reverse forensics on a specific system, a specific subsystem or a specific part within the complex machine hierarchy using the data collected from the series of nesting unique identifiers.

17. The method according to claim 15, further comprising tracking or tracing a specific system, a specific subsystem or a specific part within the complex machine hierarchy using the data collected from the series of nesting unique identifiers.

18. The method according to claim 17, further comprising creating an updated series of nesting unique identifiers after the specific system, the specific subsystem or the specific part is removed and changed out for a replacement system, a replacement subsystem or a replacement part, wherein a replacement digital twin is created for the replacement system, the replacement subsystem or the replacement part, wherein the replacement digital twin in assigned a unique replacement identifier, and wherein the unique identifier of the specific system, the specific subsystem or the specific part is deleted from the updated series of nesting unique identifiers the unique replacement identifier is included within the updated series of nesting unique identifiers.

19. The method according to claim 18, wherein the removed specific system, the removed specific subsystem or the removed specific part, along with its individual digital twin and unique identifier, is tracked through repair and/or overhaul for use in a second complex machine, wherein the specific system unique identifier, the specific subsystem unique identifier or the specific part unique identifier is added to a second series of nesting unique identifiers for the second complex machine.

* * * * *